No. 732,497. PATENTED JUNE 30, 1903.
W. R. AMOS.
HOSE COUPLING.
APPLICATION FILED APR. 3, 1903.
NO MODEL.
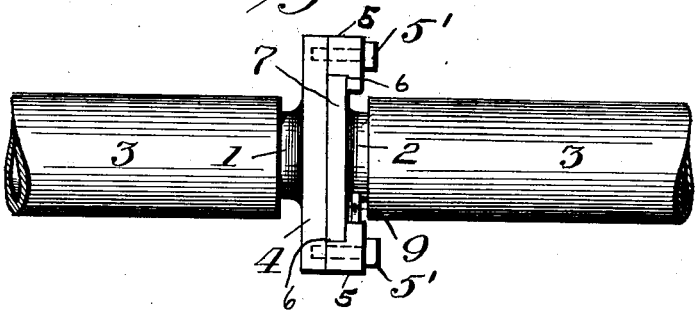
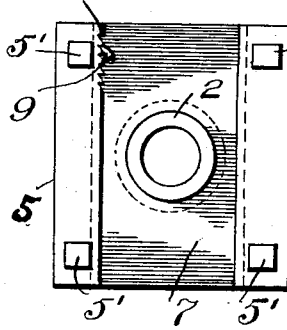 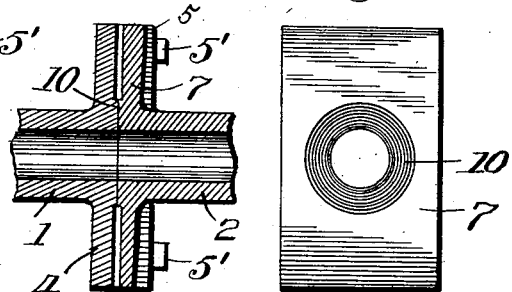
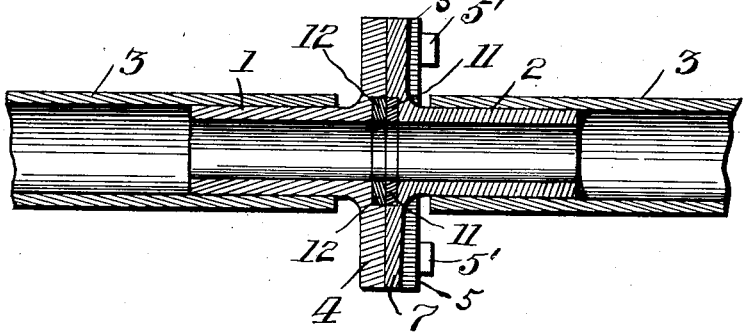
Witnesses:
Inventor,
W. R. Amos,
By
Attorneys.

No. 732,497. Patented June 30, 1903.

UNITED STATES PATENT OFFICE.

WILLIAM R. AMOS, OF SAXTON, PENNSYLVANIA.

HOSE-COUPLING.

SPECIFICATION forming part of Letters Patent No. 732,497, dated June 30, 1903.

Application filed April 3, 1903. Serial No. 150,885. (No model.)

*To all whom it may concern:*

Be it known that I, WILLIAM R. AMOS, a citizen of the United States of America, residing at Saxton, in the county of Bedford and State of Pennsylvania, have invented certain new and useful Improvements in Hose-Couplers, of which the following is a specification, reference being had therein to the accompanying drawings.

This invention relates to certain new and useful improvements in hose-couplers; and the object of the invention is to provide novel and effective means for easily joining two sections or members of a hose together in a quick and effectual manner.

Briefly described, the invention comprises a female member provided with a receiving box-like flange adapted to receive the flange or head formed on the engaging end of the male member, together with means for holding said members in the locked position.

In describing the invention in detail reference is had to the accompanying drawings, forming a part of this specification, and wherein like numerals of reference indicate like parts throughout the several views, in which—

Figure 1 is a detail plan view of my improved hose-coupler in the coupled position. Fig. 2 is an end elevation. Fig. 2ª is a longitudinal sectional view of the members in the coupled position. Fig. 3 is a rear elevation of the male member. Fig. 4 is a central longitudinal sectional view of a modified form of my improved device in the coupled position.

In the accompanying drawings, 1 indicates the female section or member, and 2 the male section or member, each of which are substantially in the form of a sleeve and receive the respective sections 3 of the hose, which is held thereon in any desirable or suitable manner. The female section 1 is provided with a face-plate 4, which has an angular flange 5 secured thereto by bolts or tapscrews 5', these angular flanges 5 being provided with grooves 6, which receive the edges of the face-plate 7, carried by the male member or section 2. The face-plate 7 is tapered on its face, as seen in Fig. 2ª, and the grooves 6 are tapered correspondingly to receive the plate 7. The edge of one of the flanges 5 is provided near the upper end of said flange with a plurality of ratchet-teeth 8, which are adapted to be engaged by the gravity-pawl 9, pivotally secured to the face-plate 7 adjacent to one edge and near the upper end of said plate. As the face-plate 7 is inserted down in position in the tapered groove 6 this gravity-pawl engages with the teeth 8 and locks with the last tooth with which it comes in engagement. In order to effect a water-tight joint, abutting bosses 10 are formed on the plates 4 and 2. To uncouple the sections, it is simply necessary to release gravity-pawl 9, whereby the plate 8 may be drawn out of engagement with the angular flanges of the plate 4.

In Fig. 4 I show the same principle of construction; but in lieu of the integral bosses 10 I form annular recesses 11 and place therein flexible gaskets 12, which project slightly beyond the face of the plates 4 and 7 and compress against each other, as shown. With this form of construction the locking device will also be employed. To prevent the pawl being accidentally disengaged, I will employ, if necessary, a spring or other device to hold this pawl in engagement.

It will be noted that in the practice of the invention various changes may be made in the details of construction without departing from the general spirit of my invention.

Having fully described my invention, what I claim as new, and desire to secure by Letters Patent, is—

In a hose-coupling of the type set forth the combination with a female member provided with bosses at its outer end, a face-plate formed integral with said member, annular flange-forming members removably secured to the face-plate, said flange members having tapered grooves therein, of a male member provided with bosses adapted to abut against those of the female member, a face-plate carried by the male member provided with inclined faces to engage the grooves of the flange members, ratchet-teeth formed on one of the flange members, and a locking means adapted to engage by gravity with said teeth to secure the sections in locked position.

In testimony whereof I affix my signature in the presence of two witnesses.

WILLIAM R. AMOS.

Witnesses:
L. P. ROSS,
JOHN N. DUVALL.